US009024806B2

(12) United States Patent
Hemmendorff

(10) Patent No.: US 9,024,806 B2
(45) Date of Patent: May 5, 2015

(54) RADAR LEVEL GAUGE WITH MCU TIMING CIRCUIT

(75) Inventor: Erik Hemmendorff, Kållered (SE)

(73) Assignee: Rosemount Tank Radar AB, Gothenburg (SE)

( * ) Notice: Subject to any disclaimer, the term of this patent is extended or adjusted under 35 U.S.C. 154(b) by 427 days.

(21) Appl. No.: 13/468,291

(22) Filed: May 10, 2012

(65) Prior Publication Data

US 2013/0300595 A1    Nov. 14, 2013

(51) Int. Cl.
 G01S 13/58 (2006.01)
 G01S 7/28 (2006.01)
 G01F 23/284 (2006.01)
 G01S 13/10 (2006.01)
 G01F 23/00 (2006.01)

(52) U.S. Cl.
 CPC ............... *G01S 7/28* (2013.01); *G01F 23/284* (2013.01); *G01S 13/10* (2013.01); *G01F 23/0069* (2013.01)

(58) Field of Classification Search
 CPC .. G01F 23/284; G01F 25/0061; G01S 13/103
 USPC ........................................................ 342/124
 See application file for complete search history.

(56) References Cited

U.S. PATENT DOCUMENTS

| 3,309,703 | A | | 3/1967 | Ammon et al. ............... 343/13 |
| 4,125,835 | A | * | 11/1978 | Barry ............................... 342/94 |
| 6,930,632 | B2 | * | 8/2005 | Lalla et al. ................... 342/124 |
| 7,233,278 | B2 | * | 6/2007 | Eriksson ...................... 342/124 |
| 7,800,528 | B2 | * | 9/2010 | Nilsson et al. ............... 342/124 |
| 2004/0004905 | A1 | * | 1/2004 | Lyon et al. ..................... 367/13 |
| 2004/0150553 | A1 | * | 8/2004 | Lalla et al. ................... 342/124 |
| 2008/0129583 | A1 | | 6/2008 | Larsson et al. ............... 342/124 |

FOREIGN PATENT DOCUMENTS

| GB | 2318006 A | 4/1998 |
| WO | 0175475 A2 | 10/2001 |
| WO | WO 03/060551 | 7/2003 |
| WO | 2010071564 A1 | 6/2010 |

OTHER PUBLICATIONS

International Search Report dated Jul. 5, 2013, for corresponding International Application No. PCT/EP2013/059440, 3 pages.

* cited by examiner

*Primary Examiner* — John B Sotomayor
*Assistant Examiner* — Marcus Windrich
(74) *Attorney, Agent, or Firm* — Westman, Champlin & Koehler, P.A.

(57) ABSTRACT

A method for determining the filling level of a product in a tank using electromagnetic signals, comprising: a) generating a transmission signal having a predetermined length; b) propagating the signal towards the product; c) receiving a reflected signal; d) determining whether the received signal overlaps the transmitted signal in the time-domain; e) setting an overlap-parameter to 1 if overlap is detected, otherwise setting the overlap-parameter to 0; if the state of the overlap parameter is not changed and if no overlap is detected, generate a signal having a length exceeding the previous length and repeat step b); and if the state of the overlap-parameter is not changed and if an overlap is detected, generate a signal having a length shorter than the previous length and repeat step b); and if the state of the overlap-parameter is changed, determine the filling level based on the length of the transmitted signal.

17 Claims, 6 Drawing Sheets

RADAR LEVEL GAUGE WITH MCU TIMING CIRCUIT

FIELD OF THE INVENTION

The present invention relates to a method, and to a level gauge system using electromagnetic signals, for determining the distance to a surface of a product contained in a tank.

TECHNICAL BACKGROUND

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide. The probe is generally arranged to extend vertically from the top towards the bottom of the tank. The probe may also be arranged in a measurement tube, a so-called chamber, which is connected to the outer wall of the tank and is in fluid connection with the inside of the tank.

The transmitted electromagnetic signals are reflected at the surface of the product, and the reflected signals are received by a receiver or transceiver comprised in the radar level gauge system. Based on the transmitted and reflected signals, the distance to the surface of the product can be determined.

More particularly, the distance to the surface of the product is generally determined based on the time between transmission of an electromagnetic signal and reception of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity of the electromagnetic signals.

Most radar level gauge systems on the market today are either so-called pulsed radar level gauge systems that determine the distance to the surface of the product contained in the tank based on the difference in time between transmission of a pulse and reception of its reflection at the surface of the product, or systems that determine the distance to the surface based on the phase difference between a transmitted frequency-modulated signal and its reflection at the surface. The latter type of systems are generally referred to as being of the FMCW (Frequency Modulated Continuous Wave) type.

For pulsed radar level gauge systems, time expansion techniques are generally used to resolve the time-of-flight.

Such pulsed radar level gauge systems typically have a first oscillator for generating a transmission signal formed by pulses for transmission towards the surface of the product contained in the tank with a transmitted pulse repetition frequency, and a second oscillator for generating a reference signal formed by reference pulses with a reference pulse repetition frequency that differs from the transmitted pulse repetition frequency.

At the beginning of a measurement sweep, the transmission signal and the reference signal are synchronized to have the same phase. Due to the frequency difference, the phase difference between the transmission signal and the reference signal will gradually increase during the measurement sweep.

During the measurement sweep, the reflection signal formed by the reflection of the transmission signal at the surface of the product contained in the tank is being correlated with the reference signal, so that an output signal is only produced when a reflected pulse and a reference pulse occur at the same time. The time from the start of the measurement sweep to the occurrence of the output signal resulting from the correlation of the reflection signal and the reference signal is a measure of the phase difference between the transmission signal and the reflection signal, which is in turn a time expanded measure of the time-of-flight of the reflected pulses, from which the distance to the surface of the product contained in the tank can be determined.

Pulsed radar level gauge system having two oscillators requires precise timing between the two oscillators in order to accurately correlate the transmission signal with the reference signal. Accordingly, the oscillator performance is critical. Furthermore, as the accuracy of the frequency difference between the transmission signal and the reference signal is important to the performance of the pulsed radar level gauge system, a lengthy calibration sequence may be required before the actual filling level measurement can start.

SUMMARY OF THE INVENTION

In view of the above-mentioned and other drawbacks of the prior art, a general object of the present invention is to provide an improved pulsed level gauge system and method, and in particular a simplified and more robust pulsed level gauge system and method for filling level determination.

According to a first aspect of the invention, these and other objects are achieved through a method for determining the filling level of a product contained in a tank using electromagnetic signals, the method comprising the steps of:

a) generating a transmission signal having a predetermined length;

b) propagating the transmission signal towards a surface of the product contained in a tank;

c) receiving a reflected signal resulting from reflection of the transmission signal at the surface of the product;

d) determining whether the received reflected signal overlaps the transmitted signal in the time-domain;

e) setting an overlap parameter to state 1 if an overlap is detected and setting the overlap parameter to state 0 if no overlap is detected; and if the state of the overlap parameter is not changed and if no overlap is detected, generating a transmission signal having an updated predetermined length exceeding the first predetermined length and repeating step b); and if the state of the overlap parameter is not changed and if an overlap is detected, generating a transmission signal having an updated predetermined length shorter than the first predetermined length and repeating step b); and if the state of the overlap parameter is changed, determining the filling level of the product contained in the tank based on the predetermined length of the transmitted signal.

The tank may be any container or vessel capable of containing a product, and may be metallic, or partly or completely non-metallic, open, semi-open, or closed. Furthermore, the filling level of the product contained in the tank may be determined directly by using a signal propagation device propagating the transmission signal towards the product inside the tank, or indirectly by using a propagation device disposed inside a so-called chamber located on the outside of the tank, but being in fluid connection with the inside of the tank in such a way that the level in the chamber corresponds to the level inside the tank. The transmission signal is an electromagnetic signal and the length of the signal should be understood as the time-duration of the signal. The signal may furthermore be provided for example as one or more pulses of arbitrary shape, as pulse train, or as waveform.

The present invention is based on the realization that an improved method and an improved level gauge system for determining the filling level of a product in a tank may be achieved by determining the distance to the surface of the product based on the properties of a transmitted signal for which an overlap in the time domain occurs between the transmitted and a resulting received reflected signal. Through the present invention, a simplified method for determining the filling level is provided as no analysis of the reflected signal is required in order to determine the filling level, the reflected signal only needs to be detected and correlated with the transmission signal. If an overlap between the received reflected signal and the transmission signal is detected, the filling level may be determined based on known properties of the transmitted signal.

In the abovementioned method, it should be noted that if the filling level is not determined in step e), a transmission signal having an updated predetermined length is generated and the method is repeated from step b). The iteration of the method is preferably performed until a filling level is determined.

In one embodiment of the invention, the transmission signal may advantageously be a single transmission pulse. When using a transmission signal in the form of a single pulse, an overlap in the time domain at a position outside of the tank between the transmitted signal and the reflected signal occurs when the leading edge of the received reflected pulse overlaps the trailing edge of the transmitted signal. Thereby, the filling level may be determined by providing a first transmission signal having a length corresponding to the height of the tank, and by stepwise decreasing the length of the transmission signal until a change in overlap state occurs, i.e. until no overlap occurs, thereby determining the filling level based on the length of the transmission signal for which the change in overlap state is determined. When the transmission signal is provided in the form of a single pulse, the length of the transmission signal is the same as the length of the pulse.

According to one embodiment of the invention, the aforementioned predetermined length of the transmission signal may advantageously be based on a previously determined filling level. In general, the first transmission signal in a measurement cycle may have an arbitrarily selected length, preferable selected so that it corresponds to a distance shorter than or equal to the height of the tank. Alternatively, the transmission signal may be provided as the shortest achievable signal. After a reflection of the first measurement signal has been received, it can be determined if the length of the signal need to be increased or decreased in order to detect the position of the surface. Hence, by stepwise altering the length of the transmission signal, the position of the surface can be found. However, by instead selecting the length of the first measurement signal in a measurement cycle based on a previously determined fill level, fewer iterations of the measurement may be required before the surface is found. Thereby, the measurement system becomes both more energy efficient and faster compared to if the length of the first transmission signal would be arbitrarily selected.

In one embodiment of the invention, the step of generating a transmission signal may comprise the sub-steps of: generating a first pulse $P_1$ having a predetermined length; generating a second pulse $P_2$ having a length different than the length of the first pulse $P_1$; performing a logical operation on the first pulse $P_1$ and the second pulse $P_2$ to provide a control pulse $P_{SW}$ having a length corresponding to a difference in length between the first pulse $P_1$ and the second pulse $P_2$; and generating a transmission signal having a length corresponding to the length of the control pulse $P_{SW}$. The shortest measurable distance is determined by the minimum achievable length of the transmission signal. Under some circumstances, such as if the surface of the product is close to the ceiling of the tank, it may not be possible to directly provide a sufficiently short transmission signal for accurately determining the distance to the surface. Thus, a logical operation may be utilized to form an intermediate control pulse having a length corresponding to the difference of two pulses. The control pulse may then in turn be used to form the transmission signal. If the first and second pulses $P_1$ and $P_2$ either begin or end at the same time, a logical XOR operation may be used to provide a control pulse $P_{SW}$ representing the difference in length between the pulses.

According to one embodiment of the invention the step of generating a transmission signal may comprise the sub-steps of: generating a first pulse $P_1$ having a predetermined length; generating a second pulse $P_2$ having a predetermined time-delay in relation to the first pulse $P_1$; perform a logical operation on the first pulse $P_1$ and the second pulse $P_2$ to provide a control pulse $P_{SW}$ having a length corresponding to the overlap of the first pulse and the second pulse; and generating a transmission signal having a length corresponding to the length of the control pulse $P_{SW}$. In a similar manner as described above, a logical operation may be used to form an intermediate control pulse which in turn is used to form the transmission signal. Here, an AND operation may be used to provide a pulse $P_{SW}$ representing the overlap between the pulses $P_1$ and $P_2$. Furthermore, the first and the second pulse $P_1$ and $P_2$ may have the same length. It is desirable to decrease and increase the length of the transmission signal by a controllable amount in order to provide transmission signals for determining the position of the surface for any filling level of the tank. Consequently, if the first pulse $P_1$ and the second pulse $P_2$ have the same length, and if the predetermined time delay is constant, the increase in length of the control pulse $P_{SW}$ which in turn controls the length of the transmission signal is equal to the increase in length of the first and second pulses, provided that both the first and second pulses are increased by the same amount. Accordingly, a straightforward manner for changing the length of the transmission signal by changing the length of the first and second pulses $P_1$ and $P_2$ is provided.

It should also be noted that a transmission signal and/or an intermediate control pulse may be generated using logical operations other than the ones mentioned above, or combinations of logical operations, such as for example, OR, NOR, NAND etc.

In one embodiment of the invention, the transmission signal may advantageously comprise two transmission pulses. In the event that the transmission signal comprises two or more pulses, the length of the transmission signal is defined as the time from the leading flank of the first pulse to the falling flank of the last pulse.

Moreover, the step of generating a transmission signal may advantageously comprise the steps of: generating a first transmission pulse $T_1$; generating a second transmission pulse $T_2$ having a predetermined time-delay in relation to the first transmission pulse $T_1$. For a transmission signal comprising a single pulse, an overlap is detected when the leading edge of the reflected pulse overlap the trailing edge of the transmitted pulse. However, a more energy efficient method for determining a filling level may be provided by using a transmission signal in the form of two transmission pulses $T_1$ and $T_2$, where the second transmission pulse $T_2$ have a controllable time delay in relation to the first transmission pulse $T_1$. Thereby, the two transmission pulses $T_1$ and $T_2$ may be made significantly shorter compared to for a transmission signal comprising a single transmission pulse. Accordingly, less energy is required for generating the transmission signal and for determining the filling level.

In one embodiment of the invention, if the state of the overlap parameter is changed for a transmission signal comprising a first transmission pulse $T_1$ and second transmission pulse $T_2$ having a predetermined time-delay in relation to the first transmission pulse $T_1$, the filling level of the product contained in the tank may be determined based on the predetermined time delay. As described above, the filling level may be determined based on known properties of the transmission signal for which a change in overlap state occurs. Here, the know property used to determine the filling level is the time delay between the two transmission pulses.

According to a second aspect of the present invention, it is provided a level gauge system using electromagnetic signals for determining the filling level of a product contained in a tank, the level gauge system comprising: transmission signal generating circuitry comprising: an oscillator for generating an electromagnetic signal; a microcontroller unit, MCU, for providing a first transmission signal having a predetermined length by controlling the oscillator; a propagation device connected to the transmission signal generating circuitry and arranged to propagate the first transmission signal towards a surface of the product inside the tank, and to return a reflected signal resulting from the reflection of the first transmission signal at the surface of the product contained in the tank; and signal routing circuitry arranged between the transmission signal generating circuitry and the propagation device, the signal routing circuitry comprising: a circulator connected to the propagation device and configured to couple the first transmission signal to the propagation device trough a first output, the circulator further being configured to receive the reflected signal from the propagation device and to couple the reflected signal to a second output; and a mixer connected to the second output of the circulator for receiving the reflected signal; the mixer further being connected to the MCU and configured to provide an overlap-indication to the MCU if the reflected signal overlap the first transmitted signal in the time-domain at the mixer; wherein the MCU is configured to set an overlap parameter to state 1 if an overlap-indication is received and to set the overlap parameter to state 0 if no overlap-indication is received; and if the state of the overlap parameter is not changed and no overlap-indication is received, generate a second transmission signal having a length exceeding that of the first transmission signal; and if the state of the overlap parameter is not changed and an overlap-indication is received, generate a second transmission signal having a length shorter than that of the first transmission signal; and if the state of the overlap parameter is changed, determine the filling level of the product contained in the tank based on the length of the transmitted signal for which the state of the overlap parameter is changed.

The propagation device may be any device capable of propagating electromagnetic signals, including transmission line probes, waveguides and various types of antennas, such as horn antennas, array antennas etc.

The mixer should in the present context be understood as a frequency mixer having two inputs and one output being configured to provide an output signal only if a signal is present on both input terminals. Accordingly the mixer acts as a logical AND-gate for the transmitted signal and the reflected signal, only providing an output if the transmitted and reflected signals overlap in the time-domain in the mixer.

The circulator should be seen as a three-port device having an input terminal for receiving the transmitted signal from the transmission signal generating circuitry, an input/output terminal for providing the transmission signal to the propagation device and for receiving the reflected signal from the propagation device, and an output terminal for providing the reflected signal to the mixer. The circulator may also be provided in the form of a four port device with separate ports for providing the transmission signal and receiving the reflected signal, respectively. However, any type of signal routing device or coupling performing the desired function of directing the signals may be used.

The MCU is a microcontroller unit having at least one output capable of pulse width modulation (PWM) in order to provide pulses of varying length for controlling the output of the oscillator so that transmission signals of varying length may be provided. The MCU further comprises an input for receiving an overlap-indication signal.

The second aspect of the present invention is based on the realization that an improved level gauge system for determining the distance to a product in a tank may be achieved through the use of a MCU which controls the length of a transmission signal generated by an RF-oscillator. The received signal resulting from a reflection at the surface of the product to be measured is compared to the transmitted signal in the time-domain, and if an overlap occurs, the distance which the received reflected signal has traveled is shorter than the length of the signal multiplied by the speed of light. Accordingly, the distance to the surface is half of the distance traveled by the pulse, thereby, the distance to the surface may be determined based on the length of the transmitted signal for which an overlap is detected. In the described system, the minimum measurable distance of the level gauge system is approximately proportional to half of the minimum pulse length which the MCU can achieve and the resolution is proportional to the minimum length with which the transmission signal may be increased.

An advantage of the second aspect of the invention, in addition to the advantages discussed in relation to the first aspect of the invention, is that the complexity of the measurement circuitry can be reduced compared to radar level gauge systems known in the art requiring two oscillators. Furthermore, the measurement system according to the present invention is less sensitive to timing errors, and the performance of the oscillator is less critical compared to in systems where the phase or frequency difference of signals generated by different oscillators are used to determine a distance. Moreover, as the resolution of the measurement is based on the performance of the MCU, and as the performance of MCUs is continually improving, the measurement system may easily be upgraded by replacing the MCU.

A further advantage of using an MCU in the measurement system is that peripheral components such as amplifiers, attenuators and power supplies may be controlled by the MCU, thereby enabling improvements in performance and/or power efficiency which may not have been possible otherwise.

In one embodiment of the invention, the MCU may advantageously be configured to initiate the oscillator a predetermined time prior to providing the transmission signal.

Furthermore, the level gauge system may further comprise a switch controlled by the MCU for switching the output of the oscillator between an on state and an off state. As the oscillator may require a certain startup-period, or initiation period, before a stable frequency is reached and a stable RF-signal can be provided, instead of controlling the output of the oscillator by controlling the power supply to the oscillator, a microwave switch controlled by the MCU may be connected to the output of the oscillator. Thereby, the MCU can control the power supply of the oscillator so that it starts a sufficient time before the transmission signal is to be provided. Thus, the transmission signal is provided by triggering the microwave switch connected to the output of the oscillator a sufficient time after the oscillator has been initiated, thereby making the inherent startup-time of the oscillator less relevant.

According to one embodiment of the invention, the overlap-indication from the mixer may advantageously be a direct current (DC) pulse. In the present measurement system, the overlap-indication signal provided by the mixer does not have to contain any information. Thereby, it is sufficient that a DC-pulse is provided. The DC-pulse may in turn be detected by an amplitude detector which in turns provides an overlap indication signal of a suitable format to the MCU.

In one embodiment of the invention, transmission signal generating circuitry further comprises logic circuitry configured to provide a control pulse $P_{SW}$ corresponding to a difference between a first pulse $P_1$ and a second pulse $P_2$ provided by a first and a second output of the MCU, and wherein the control pulse $P_{SW}$ is coupled to the switch for controlling the output of the oscillator such that a transmission signal $S_T$ having a length corresponding to the length of the control pulse $P_{SW}$ is provided by the oscillator.

As the shortest measurable distance of the measurement system is proportional to the length of the transmitted signal, it is desirable to achieve a transmission signal which is as short as possible in order to be able to detect filling levels when the tank is close to being full. Meanwhile, in MCUs, the minimum achievable pulse length is typically substantially longer than the minimum achievable step size of the pulse length. Accordingly, the resolution of the measurement system can be increased by providing logic circuitry according to the abovementioned so that the minimum length of the transmission signal is equal to the minimum step size of the MCU. Accordingly, a transmission signal having a length equal to the minimum achievable step size of the pulse length may be provided by taking the difference between two pulses having lengths differing by one step size.

According to one embodiment of the invention, the level gauge system may further comprise a controllable delay circuit arranged between the signal generating circuitry and the mixer for delaying the transmission signal. It may be desirable to improve the resolution of the filling level measurement beyond the limit set by the minimum step length achievable by the MCU. A controllable delay circuit arranged between the directional coupler and the mixer may delay the transmission signal in relation to the reflected signal at the mixer by an increment which is significantly smaller than the minimum step size of the MCU. Thereby, once the filling level has been determined as described above by controlling the length of the transmission signal by the MCU, a second iterative measuring process may be performed by stepwise increasing or decreasing the delay of the controllable delay circuit.

According to one embodiment of the invention, the level gauge system may further comprise a controllable delay circuit arranged between the circulator and the mixer for delaying the reflected signal. In a similar manner as described above, the resolution of the filling level measurement may be improved by a arranging a controllable delay circuit between the circulator and the mixer, thereby controlling the delay of the reflected signal on the way to the mixer.

In one embodiment of the invention, the level gauge system may further comprise a controllable delay circuit arranged between the MCU and the switch for delaying at least a portion of the transmission signal. As discussed in relation to the first aspect of the invention, it may be advantageous to use a transmission signal comprising two transmission pulses. When using a transmission signal comprising two pulses, the resolution of the filling level measurement is limited by the minimum stepwise change of time delay between the two pulses achievable by the MCU. This resolution may be improved by arranging a controllable delay circuit between the MCU and the switch which is controllable to delay only one of the two pulses comprised in the transmission signal. The delay circuit may preferably be controllable by the MCU such that for example the first pulse of the transmission signal is not delayed while the second pulse is delayed by a controllable time-period.

According to one embodiment of the invention the propagation device may comprise a first propagation device for transmitting said transmission signal towards said surface and a second propagation device for receiving said reflected signal. It may be advantageous to separate a transmitting portion and a receiving portion of the propagation device in order to avoid reflections at the interface between the signal generating circuitry and the propagation device from reaching the signal receiving circuitry, i.e. the mixer in the abovementioned system. With reference to the level gauge system of the present invention, a transmission signal may be partially reflected at the interface between the circular coupler and the propagation device, thereby interfering with the signal reflected at the surface. Such interfering reflections may be avoided by eliminating the circulator so that the transmission signal is propagating directly from the directional coupler to a first propagation device, and by providing a second propagation device for receiving the reflected signal which is connected directly to the input of the mixer.

Further effects and features of this second aspect of the present invention are largely analogous to those described above in connection with the first aspect of the invention.

BRIEF DESCRIPTION OF THE DRAWINGS

These and other aspects of the present invention will now be described in more detail, with reference to the appended drawings showing an exemplary embodiment of the invention, wherein.

DETAILED DESCRIPTION OF EXAMPLE EMBODIMENTS OF THE INVENTION

In the present detailed description, various embodiments of the level gauge system according to the present invention are mainly discussed with reference to a pulsed radar level gauge system of the non-contact type, in which an electromagnetic signal is propagated towards the product contained in the tank using a propagating device in the form of a radiating antenna, such as a cone antenna, a horn antenna, an array antenna or a patch antenna.

It should be noted that this by no means limits the scope of the present invention, which is equally applicable to pulsed guided wave radar (GWR) level gauge system utilizing a propagating device in the form of a probe, such as a single line probe (including a so-called Goubau probe), a two-lead probe, a coaxial probe, etc.

Figure 1:
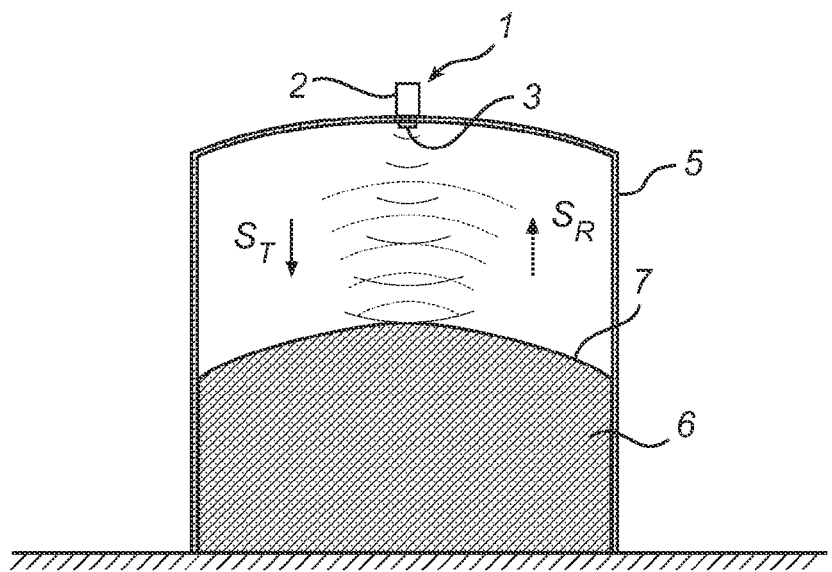
FIG. 1 schematically illustrates a level gauge system according to an embodiment of the present invention installed in an exemplary tank.

FIG. 1 schematically illustrates a level gauge system 1 according to an embodiment of the present invention, comprising a measurement electronics unit 2, and a propagation device in the form of a radiating antenna device 3. The radar level gauge system 1 is provided on a tank 5, which is partly filled with a product 6 to be gauged. In the case illustrated in FIG. 1, the product 6 is a liquid, such as water or a petroleum-based product, but the product may equally well be a solid, such as grain or plastic pellets. By analyzing a transmission signal $S_T$ being radiated by the antenna device 3 towards the surface 7 of the product 6, and a reflected signal $S_R$ traveling back from the surface 7, the measurement electronics unit 2 can determine the distance between a reference position and the surface 7 of the product 6, whereby the filling level can be deduced. The reference position may for example be the position of the antenna device 3. It should be noted that, although a tank 5 containing a single product 6 is discussed herein, the distance to any material interface present in the tank 5 can be measured in a similar manner.

Figure 2:
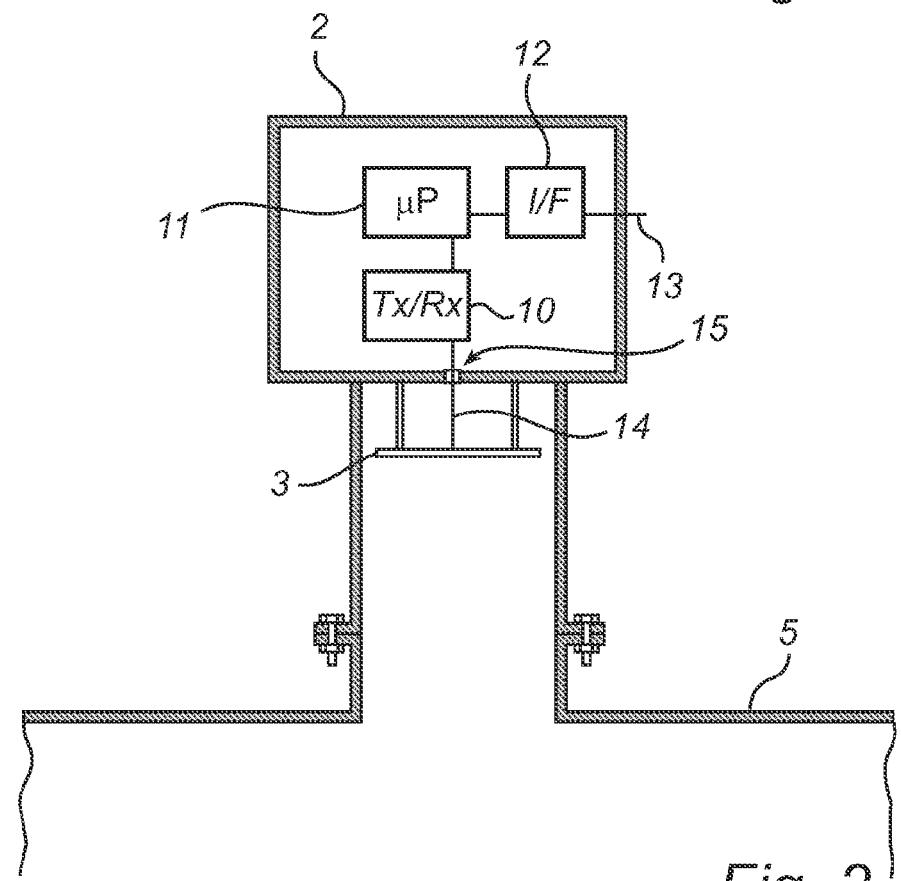
FIG. 2 is a schematic illustration of the measurement electronics unit comprised in the level gauge system in FIG. 1.

As is schematically illustrated in FIG. 2, the electronics unit 2 comprises a transceiver 10 for transmitting and receiving electromagnetic signals, a processing unit 11, which is connected to the transceiver 10 for control of the transceiver and processing of signals received by the transceiver to determine the filling level of the product 6 in the tank 5.

The processing unit 11 is, furthermore, connectable to external communication lines 13 for analog and/or digital communication via an interface 12. Moreover, although not shown in FIG. 2, the radar level gauge system 1 is typically connectable to an external power source, or it may be powered through the external communication lines 13. Alternatively, the radar level gauge system 1 may be powered locally, and may be configured to communicate wirelessly.

Although being shown as separate blocks in FIG. 2, several of the transceiver 10, the processing circuitry 11 and the interface 12 may be provided on the same circuit board.

In FIG. 2, furthermore, the transceiver 10 is illustrated as being separated from the interior of the tank 5 and connected to the antenna device 3 via a conductor 14 passing through a feed-through 15 provided in the tank wall. It should be understood that this is not necessarily the case, and that at least the transceiver 10 may be provided in the interior of the tank 5. For example, in case the antenna device 3 is provided in the form of a patch antenna as is schematically illustrated in FIG. 2, at least the transceiver 10 and the patch antenna 3 may be provided on the same circuit board.

Figure 3:
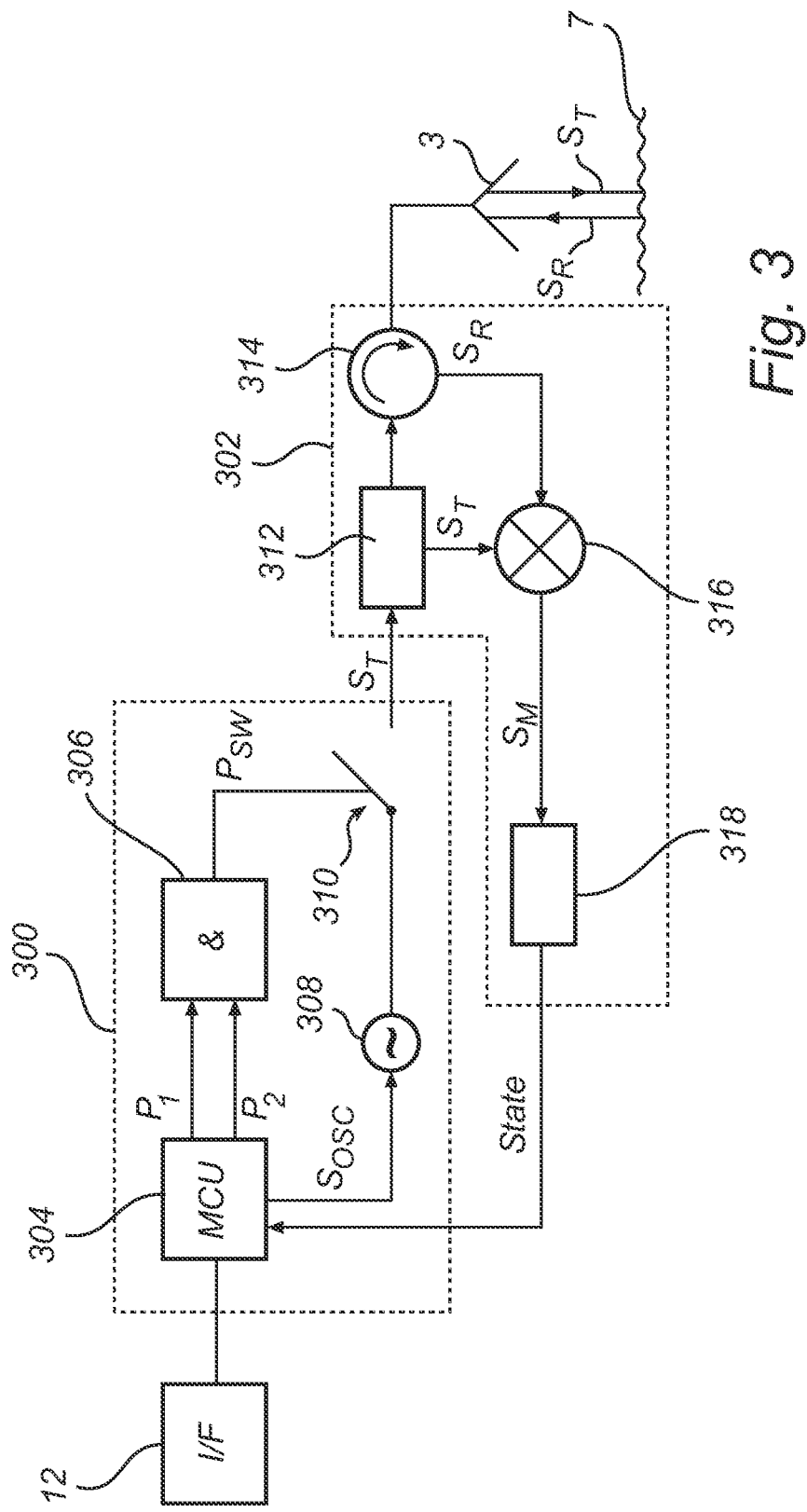
FIG. 3 is a block diagram schematically illustrating the level gauge system in FIG. 1.

FIG. 3 is a block diagram schematically showing functional components comprised in the level gauge system in FIG. 1. The exemplary level gauge system 1 comprises transmission signal generating circuitry 300, signal routing circuitry 302 and a propagation device 3.

The transmission signal generating circuitry comprises a microcontroller unit, MCU, 304, a logic circuit 306, an RF-oscillator 308 and a switch 310 controlling the output of the RF-oscillator 308.

When the MCU 304 receives a command that a level measurement is to be performed, the MCU 304 initiates the oscillator 308 so that the oscillator has time to start and reach a stable frequency before a transmission signal is to be provided. Next, the MCU 304 provides a first and a second pulse, $P_1$, $P_2$, to the logic circuitry 306, which in the present example is represented as a logical-AND function. The MCU 310 is provided with at least two outputs capable of pulse width modulation in order to provide pulses $P_1$ and $P_2$ having a controllable length. The signal resulting from the logical operation in the logic circuitry 306 is a control signal $P_{SW}$ for controlling the microwave switch 310 connected to the output of the RF-oscillator. When the control signal $P_{SW}$ is high, the switch 310 is closed. Thereby, a transmission signal $S_T$ having a length equal to the length of the control signal $P_{SW}$ is provided by the RF-oscillator 308 to the signal routing circuitry 302.

The signal routing circuitry 302 comprises a directional coupler 312, a circulator 314, a mixer 316 and an amplitude detector 318. The transmission signal $S_T$ is received by the directional coupler 312 which provides the transmission signal $S_T$ both to the mixer 316 and to the circulator 314. A directional coupler may also be described as a power divider. Any type of directional coupler or power divider known by the person skilled in the art, such as a transmission line coupler, a waveguide coupler, hybrid coupler or a discrete element coupler, may be used to achieve the desired effect of coupling the transmission signal $S_T$ to two outputs.

In the circulator 314, the transmission signal $S_T$ is provided to the propagation device 3 where it is transmitted towards the surface 7 of the product to be measured. The signal reflected at the surface 7, or at an intermediate interface in the product, is received by the propagation device 3 and provided back to the circulator 314. The circulator 314, here described as a three-port device, is configured so that the port connected to the propagation device 3 outputs the transmission signal $S_T$ received from the port connected to the directional coupler 312, and the reflected signal $S_R$ received by the port of the circulator 314 connected to the propagation device 3 is output on the port connected to the mixer 316. It should be noted that the circulator may also be embodied as a four-port device.

In the mixer 316, the transmission signal $S_T$ and the reflected signal $S_R$ is received and the mixer 316 is configured to provide an output signal $S_M$ if there is an overlap in the time-domain between the two signals. The output signal $S_M$ may typically be a DC-signal. For example, a doubly balanced mixer may be used which provides no output signal if either of the input signals is not present.

An amplitude detector 318 is connected between the output of the mixer 316 and the MCU 304 to detect an output signal $S_M$ from the mixer and to convert the output signal $S_M$ into a "state"-signal having a format which may be read by the MCU 304. The signal provided by the amplitude detector 318 represent the state of overlap between $S_T$ and $S_R$, i.e. if no overlap occurs, no signal is provided which represents state "0", and if an overlap occurs, a signal is provided to the MCU 304 representing state "1".

Figure 4A:
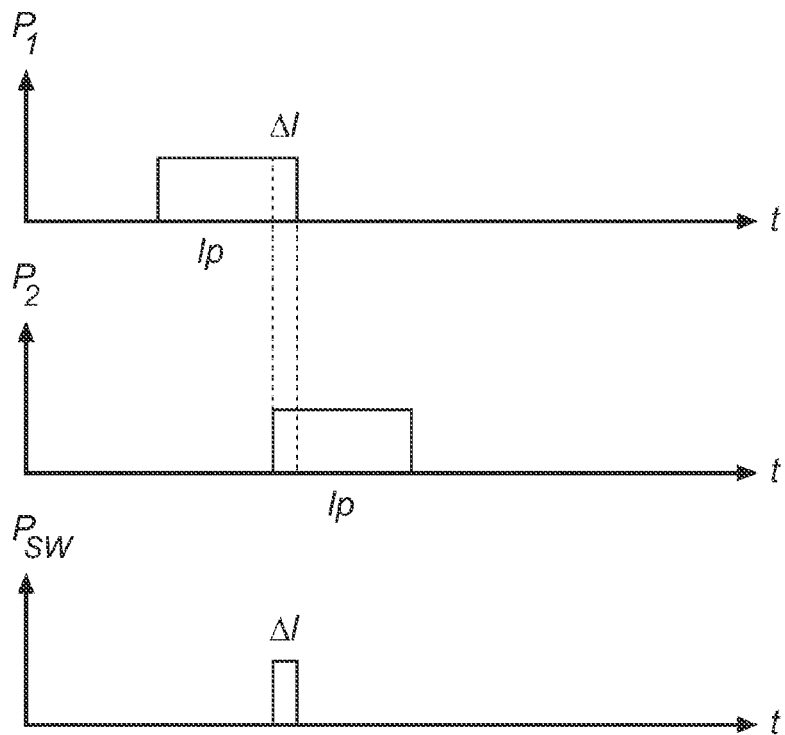
FIGS. 4a and b schematically illustrate pulse generation in a level gauge system according to an embodiment of the present invention.
Figure 4B:
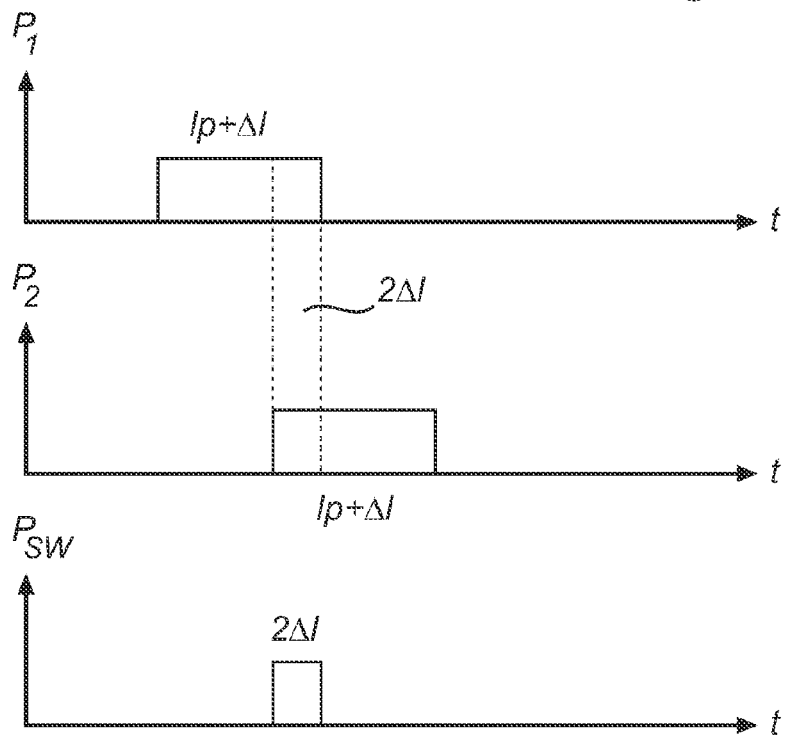

FIGS. 4a and 4b illustrate a method for forming a control signal $P_{SW}$ having the desirable length where the minimum length of the control signal $P_{SW}$ is equal to the minimum step size of the pulse length which may be provided by the MCU 304, which in turn corresponds to the shortest measureable distance. As an example, the minimum pulse length $l_p$ from an MCU 304 may be 500 ps while the minimum step size $\Delta l$ of the pulse length may be 60 ps. Thereby, the minimum measurable distance is significantly reduced when a transmission signal based on the minimum step size is used.

In FIG. 4a, a first pulse $P_1$ having a length $l_p$ is provided from a first output of the MCU 304. A second pulse $P_2$, also of length $l_p$, is provided by a second output of the MCU 304.

Here, $P_2$ is delayed in time in relation to $P_1$ by lp−Δl. Thereby a control signal $P_{SW}$ having the length Δl is formed which is used to form a transmission signal $S_T$ having the length Δl.

In FIG. 4b, pulses $P_1$ and $P_2$ both have a length of lp+Δl while the delay between the pulses remains unchanged, i.e. lp−Δl. Accordingly, a control pulse $P_{SW}$ having the length 2Δl is formed.

Thereby, a method for forming transmission signals having a length equal to an integer times the minimum achievable step size of the MCU 304 is provided.

It should be noted that the abovementioned method is merely one example on how a transmission signal may be formed. The person skilled in the art readily realizes that a transmission signal may be formed in other ways by using other logical elements or by using combinations of logical elements for achieving the desired logical functions. Furthermore, more than two pulses may also be used to form a desirable control signal.

Figure 5:
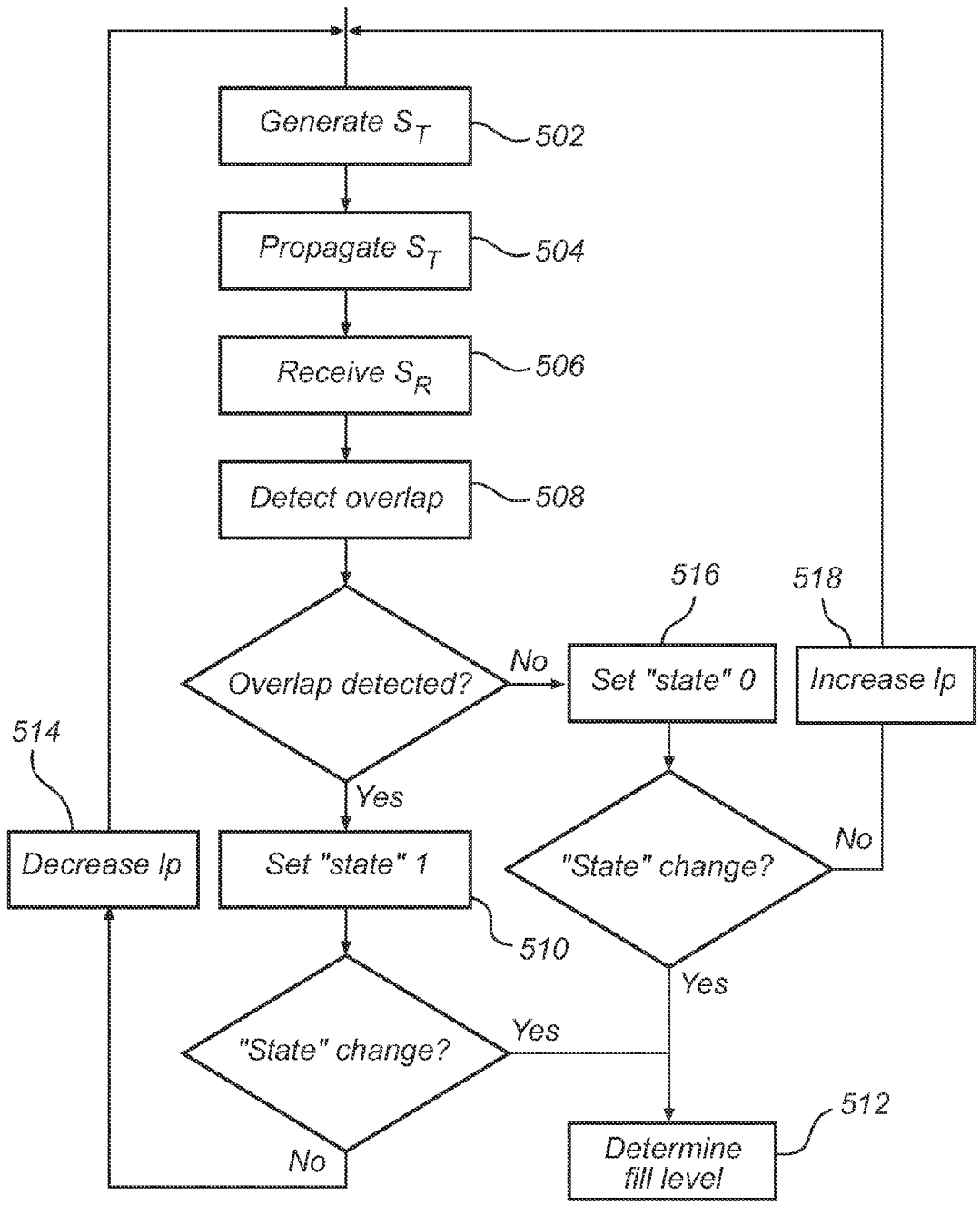
FIG. 5 is a flow chart schematically outlining a method according to an embodiment of the present invention.

FIG. 5 is a flow chart illustrating a method for determining a filling level according to an embodiment of the invention.

First, in step 502 a transmission signal $S_T$ is generated.

In step 504, the transmission signal $S_T$ is propagated towards the surface of the product to be measured and a resulting reflected signal $S_R$ is received in step 506.

Next, in step 508 it is determined if an overlap occurs between the transmitted signal $S_T$ and the received reflected signal $S_R$.

If an overlap is detected, the state-parameter is set to "1" in step 510. If the setting of the state-parameter to "1" results in a change of state, it can be concluded that the present transmission signal have a length corresponding to the distance to the surface. As the most previously transmitted signal did not result in an overlap, the length of the previous signal does not correspond to the distance to the surface. Thus, the distance to the surface and thereby the filling level may be determined in step 512 based on the length of the transmission signal for which a change in the state-parameter indicating overlap is detected.

If on the other hand, if no state change occurs, the length of the transmission signal is decreased in step 514 and the method starts over at step 502.

In the case where no overlap is detected in step 508, the state-parameter is set to "0" in step 516. Following a similar line of reasoning as above, if the setting of the state-parameter to "0" results in a changed state, the filling level may be determined in step 512.

If setting the state to "0" in step 516 does not lead to a state change, it means that the length of the transmitted signal corresponds to a distance shorter than that of the distance to the surface. Accordingly, the length of the transmission signal is increased in step 518 and the measurement method starts over at step 502.

Figure 6A:
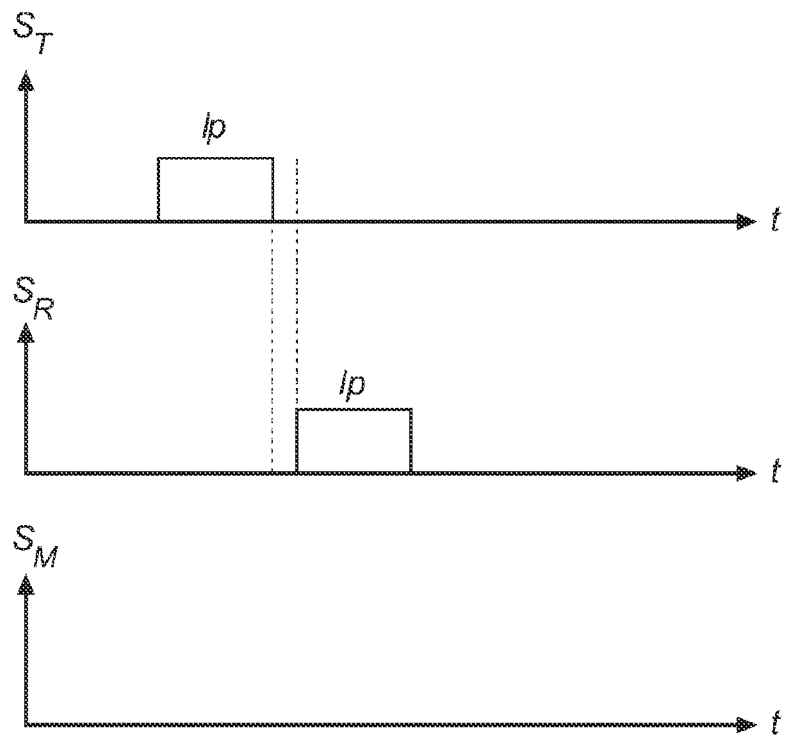
FIGS. 6a and b schematically illustrate transmission signals in a level gauge system according to an embodiment of the present invention.
Figure 6B:
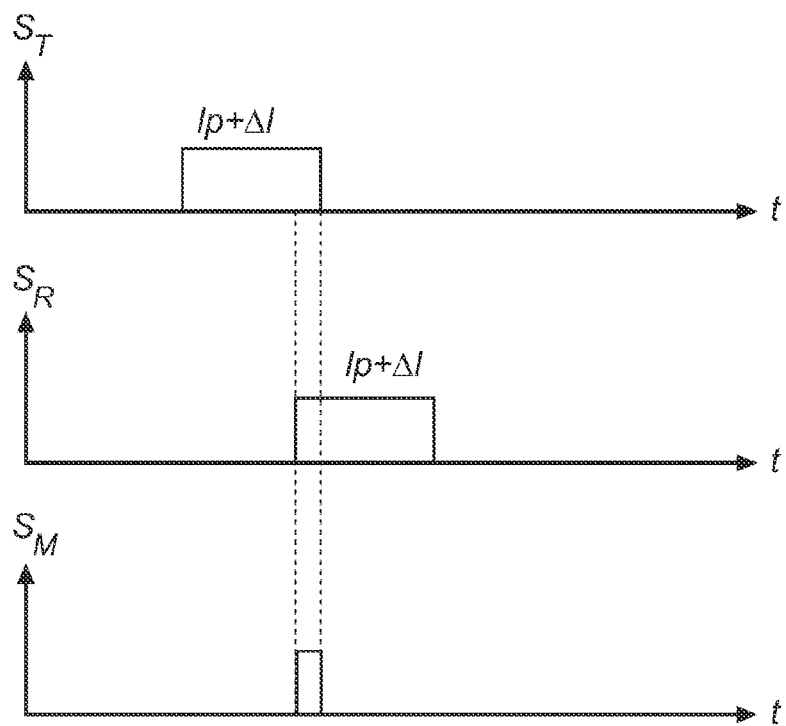

FIGS. 6a and 6b schematically illustrates the relation between the transmitted signal $S_T$ and the reflected signal $S_R$ for the cases where overlap does and does not occur at the mixer 316. The signals are illustrated in the time domain at the position of the mixer 316. Using the same notation as in FIG. 4, FIG. 6a shows a transmission signal $S_T$ having the length $l_p$ and a corresponding reflected signal $S_R$. In FIG. 6a the transmitted and reflected signals, $S_T$ and $S_R$, does not overlap in the time-domain, accordingly, the distance to the surface is longer than the length corresponding to the transmitted signal $S_T$ and no overlap-indication is provided by the mixer.

In FIG. 6b, the length of $S_T$ is increased by Δl and it is illustrated how the reflected signal $S_R$ overlap the transmitted signal $S_T$ in the time-domain at the mixer 316, and an output signal from the mixer $S_M$ indicating an overlap is provided, thus it can be determined that the distance to the surface is smaller than the distance corresponding to the latest transmitted signal $S_T$.

As an example, assuming that the length of a transmitted signal for which overlap occurs is 10 ns, with the signal travelling at the speed of light, the corresponding distance traveled by the signal is 3 m. Given that the signal travels to the surface and back, the distance to the surface is 1.5 m. The measured distance may need to be compensated due to for example the length of cabling between the directional coupler and the propagation device, and between the propagation device and the mixer. It may also be desirable to compensate the measured distance in situations where the signal propagates in a medium having a dielectric constant significantly differing from the dielectric constant of vacuum. Such compensations may advantageously be performed by the MCU. Following the same reasoning, a minimum step size of 60 ps as mentioned above provides a level measurement resolution of approximately 9 mm.

In order to further improve the resolution of the level gauge system, a controllable delay circuit may be arranged either between the directional coupler 312 and the mixer 316 for delaying the transmission signal $S_T$ in relation to the reflected signal $S_R$ at the mixer 316, or between the circulator 314 and the mixer 316 for delaying the reflected signal $S_R$ in relation to the transmission signal $S_T$ at the mixer 316. As the general principle is the same for both arrangements, only the case where the delay circuit is arranged between the directional coupler 312 and the mixer 316 will be described.

Assuming that the default condition is that no delay is introduced by the delay circuit, the filling level measurement may be performed as described above and a measured filling level is determined based on the signal length for which a change in overlap state is detected. By transmitting the last (i.e. the longest) signal for which an overlap is detected, and by stepwise increasing the delay of the transmitted signal between the directional coupler and the mixer, a new change in overlap state will be detected when the two signals no longer overlap at the mixer. Now, the filling level may be determined by taking the length of the transmission signal and subtracting the delay for which the change in overlap state occurred. As both the delay and the length of the transmission signal are controlled and known by the MCU, the distance corresponding to the delay may simply be subtracted from the distance based on the pulse length for reaching a more accurate measurement.

The controllable delay circuit may for example be a printed circuit board (PCB) having transmission lines of different physical length. Thereby, the delay of a signal may be controlled by controlling the path which the transmission signal takes through one or more transmission lines in the delay circuit.

Figure 7:
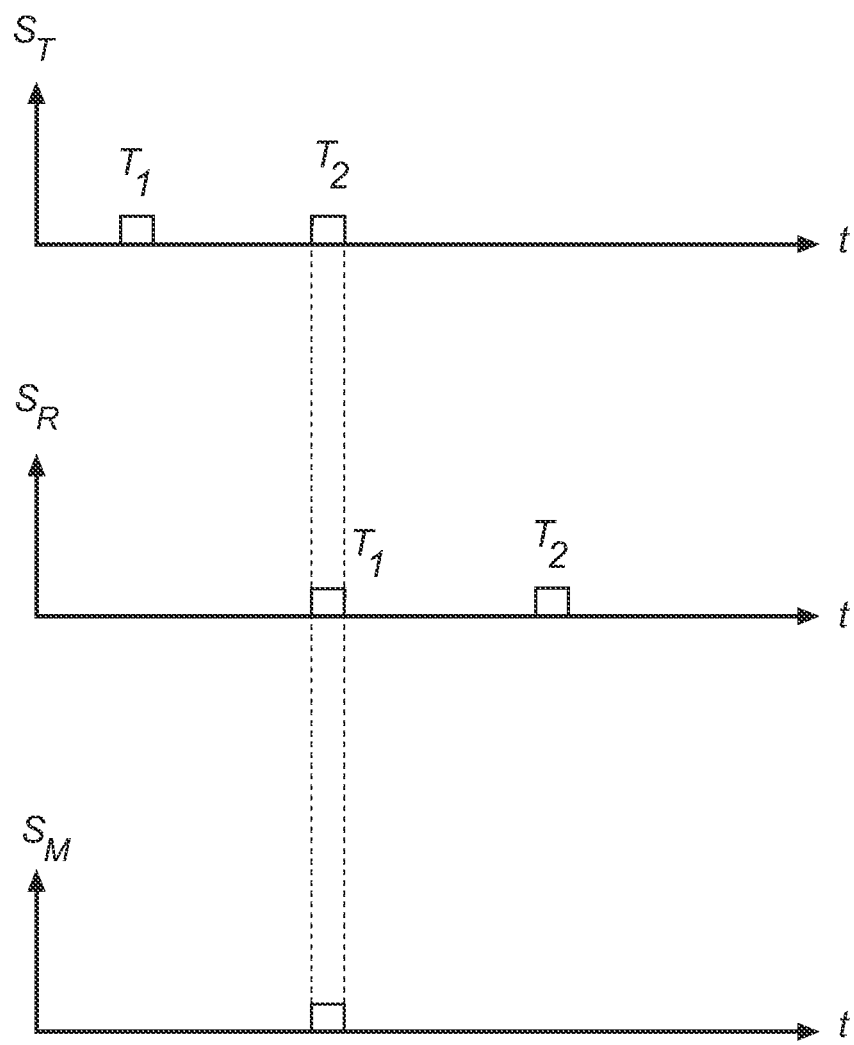
FIG. 7 schematically illustrates a transmission signal in a level gauge system according to an alternative embodiment of the present invention.

In one embodiment of the invention, the transmission signal $S_T$ may comprise two transmission pulses $T_1$ and $T_2$ as schematically illustrated in FIG. 7. As an overlap for a transmission signal comprising a single pulse takes place between the leading flank of the reflected signal and the trailing flank of the transmitted signal as illustrated in FIG. 6b, a more energy efficient signaling scheme may be achieved by eliminating the middle portions of the transmitted signal. Accordingly, for a transmission signal ST comprising two separate transmission pulses, $T_1$ and $T_2$, where $T_2$ is controllably delayed in relation to $T_1$, the overlap takes place between $T_1$ of the reflected signal and the $T_2$ of the transmitted signal. Thereby, the energy consumption of the measurement system may be significantly reduced compared to if a single transmission pulse was to be used. Different distances may be measured by varying the distance between the two pulses, thereby, when an overlap is detected by the mixer 316 as illustrated in FIG. 7, the distance to the surface may be determined by the MCU 304 by triggering readout of the known time-delay between $T_1$ and $T_2$. An additional advantage of using two transmission signals is that reflections from the antenna are reduced.

The aforementioned controllable delay circuit may be used also for a transmission signal comprising two transmission pulses. However, the two-pulse signaling scheme opens up for an alternative arrangement of the controllable delay circuit, namely between the MCU 304 and the switch 310 replacing the logical circuit 306. With such an arrangement, the MCU may provide two pulses, $P_1$ and $P_2$, and control the delay circuit to delay only one of the two pulses so that two transmission pulses $T_1$ and $T_2$ are formed having a time difference determined both by the time delay between $P_1$ and $P_2$ and by the time-delay from delay circuit. Thereby the same improvement in resolution as described above may be achieved by the controllable delay circuit.

Furthermore, it should be realized that various search algorithms for finding the surface may be used by the MCU. Such search algorithms may for example comprise providing a first transmission signal corresponding to a halfway filled tank, and if no overlap is detected, the following transmission signal may correspond to a tank which is filled by ¼, and so on.

It is noted that the invention has mainly been described above with reference to a few embodiments. However, as is readily appreciated by a person skilled in the art, other embodiments than the ones disclosed above are equally possible within the scope of the invention, as defined by the appended claims.

It is further noted that, in the claims, the word "comprising" does not exclude other elements or steps, and the indefinite article "a" or "an" does not exclude a plurality. A single apparatus or other unit may fulfill the functions of several items recited in the claims. The mere fact that certain measures are recited in mutually different dependent claims does not indicate that a combination of these measured cannot be used to advantage.

What is claimed is:

1. A method for determining the filling level of a product contained in a tank using electromagnetic signals, said method comprising the steps of:
   a) generating a transmission signal having a predetermined length in a measurement electronics unit;
   b) propagating said transmission signal towards a surface of said product contained in a tank via a radiating antenna;
   c) receiving a reflected signal resulting from reflection of said transmission signal at said surface of said product via the radiating antenna or a receiving antenna;
   d) determining whether said received reflected signal overlaps said transmitted signal in the time-domain via the measurement electronics unit;
   e) setting an overlap parameter to state 1 if an overlap is detected and setting said overlap parameter to state 0 if no overlap is detected; and
   if the state of said overlap parameter is not changed and if no overlap is detected, generating a transmission signal having an updated predetermined length exceeding said first predetermined length and repeating step b); and
   if the state of said overlap parameter is not changed and if an overlap is detected, generating a transmission signal having an updated predetermined length shorter than said first predetermined length and repeating step b); and
   if the state of said overlap parameter is changed, determining the filling level of the product contained in the tank based on the predetermined length of the transmitted signal via the measurement electronics unit.

2. The method according to claim 1, wherein said transmission signal is a single transmission pulse.

3. The method according to claim 1, wherein said predetermined length of said transmission signal in step a) is based on a previously determined filling level.

4. The method according to claim 1, wherein the step of generating a transmission signal comprises the sub-steps of:
   generating a first pulse $P_1$ having a predetermined length;
   generating a second pulse $P_2$ having a length different than the length of said first pulse $P_1$,
   performing a logical operation on said first pulse $P_1$ and said second pulse $P_2$ to provide a control pulse $P_{sw}$ having a length corresponding to a difference in length between said first pulse $P_1$ and said second pulse $P_2$; and
   generating a transmission signal having a length corresponding to the length of said control pulse $P_{sw}$.

5. The method according to claim 1, wherein the step of generating a transmission signal comprises the sub-steps of:
   generating a first pulse $P_1$ having a predetermined length;
   generating a second pulse $P_2$ having a predetermined time-delay in relation to said first pulse $P_1$;
   perform a logical operation on said first pulse $P_1$ and said second pulse $P_2$ to provide a control pulse $P_{sw}$ having a length corresponding to the overlap of said first pulse and said second pulse; and
   generating a transmission signal having a length corresponding to the length of said control pulse $P_{sw}$.

6. The method according to claim 1, wherein said transmission signal comprises two transmission pulses.

7. The method according to claim 6, wherein the step of generating a transmission signal comprises the steps of:
   generating a first transmission pulse $T_1$;
   generating a second transmission pulse $T_2$ having a predetermined time-delay in relation to said first transmission pulse $T_1$
   wherein the predetermined length of said first transmission pulse $T_1$ is set sufficiently short so that in the step of determining whether said received reflected signal overlaps said transmitted signal of said first and second transmission pulses $T_1$ and $T_2$, only the second transmission pulse $T_2$ overlaps the reflected first transmission pulse $T_1$ in the time-domain.

8. The method according to claim 7, wherein if said state of said overlap parameter is changed for a transmission signal comprising a first transmission pulse $T_1$ and second transmission pulse $T_2$ having a predetermined time-delay in relation to said first transmission pulse $T_1$, determine the filling level of the product contained in the tank based on said predetermined time delay.

9. A level gauge system using electromagnetic signals for determining the filling level of a product contained in a tank, said level gauge system comprising:
   transmission signal generating circuitry comprising:
      an oscillator for generating an electromagnetic signal;
      a microcontroller unit, MCU, for providing a first transmission signal having a predetermined length by controlling said oscillator;
   a propagation device connected to said transmission signal generating circuitry and arranged to propagate said first transmission signal towards a surface of said product inside the tank, and to return a reflected signal resulting from the reflection of said first transmission signal at said surface of the product contained in the tank; and signal routing circuitry arranged between said transmission signal generating circuitry and said propagation device, said signal routing circuitry comprising:
- a circulator connected to said propagation device and configured to couple said first transmission signal to said propagation device trough a first output, said circulator further being configured to receive said reflected signal from said propagation device and to couple said reflected signal to a second output; and
- a mixer connected to said second output of said circulator for receiving said reflected signal; said mixer further being connected to said MCU and configured to provide an overlap-indication to said MCU if said reflected signal overlap said first transmitted signal in the time-domain at said mixer;

wherein said MCU is configured to set an overlap parameter to state 1 if an overlap-indication is received and to set said overlap parameter to state 0 if no overlap-indication is received; and if the state of said overlap parameter is not changed and no overlap-indication is received, generate a second transmission signal having a length exceeding that of the first transmission signal; and if the state of said overlap parameter is not changed and an overlap-indication is received, generate a second transmission signal having a length shorter than that of the first transmission signal; and if the state of said overlap parameter is changed, determine the filling level of the product contained in the tank based on the length of the transmitted signal for which said state of said overlap parameter is changed.

10. The level gauge system according to claim 9, wherein said MCU is configured to initiate said oscillator a predetermined time prior to providing said transmission signal.

11. The level gauge system according to claim 9, further comprising a switch controlled by said MCU for switching the output of said oscillator between an on state and an off state.

12. The level gauge system according to claim 9, wherein said overlap-indication from said mixer is a direct current (DC) pulse.

13. The level gauge system according to claim 9, wherein said transmission signal generating circuitry further comprises logic circuitry configured to provide a control pulse $P_{sw}$ corresponding to a difference between a first pulse $P_1$ and a second pulse $P_2$ provided by a first and a second output of said MCU, and wherein said control pulse $P_{sw}$ is coupled to said switch for controlling the output of the oscillator such that a transmission signal $S_T$ having a length corresponding to the length of said control pulse $P_{sw}$ is provided by said oscillator.

14. The level gauge system according to claim 9, further comprising a controllable delay circuit arranged between said transmission signal generating circuitry and said mixer for delaying said transmission signal.

15. The level gauge system according to claim 9, further comprising a controllable delay circuit arranged between said circulator and said mixer for delaying said reflected signal.

16. The level gauge system according to claim 9, further comprising a controllable delay circuit arranged between said MCU and said switch for delaying at least a portion of said transmission signal.

17. The level gauge system according to claim 9, wherein said propagation device comprises a first propagation device for transmitting said transmission signal towards said surface and a second propagation device for receiving said reflected signal.

* * * * *